United States Patent
Lehmann et al.

(10) Patent No.: US 11,214,242 B2
(45) Date of Patent: Jan. 4, 2022

(54) HYBRID POWERTRAIN WITH TWO ELECTRIC MACHINES AND AN INTERNAL COMBUSTION ENGINE

(71) Applicant: Volkswagen Aktiengesellschaft, Wolfsburg (DE)

(72) Inventors: Steffen Lehmann, Ettlingen (DE); Andreas Trinkenschuh, Bühl (DE); Frank Müller, Essenrode (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/060,865

(22) Filed: Oct. 1, 2020

(65) Prior Publication Data
US 2021/0016766 A1 Jan. 21, 2021

Related U.S. Application Data

(62) Division of application No. 16/765,698, filed as application No. PCT/DE2018/100865 on Oct. 23, 2018.

(30) Foreign Application Priority Data

Nov. 23, 2017 (DE) ..................... 10 2017 127 695.5

(51) Int. Cl.
*B60W 10/06* (2006.01)
*B60W 20/20* (2016.01)
(Continued)

(52) U.S. Cl.
CPC ............... *B60W 20/20* (2013.01); *B60K 6/48* (2013.01); *B60W 10/06* (2013.01); *B60W 10/08* (2013.01);
(Continued)

(58) Field of Classification Search
CPC ...... B60W 20/20; B60W 10/06; B60W 10/08; B60W 2510/0208; B60K 6/48;
(Continued)

(56) References Cited

U.S. PATENT DOCUMENTS

| | | | |
|---|---|---|---|
| 2006/0102409 A1 | 5/2006 | Kamada et al. | |
| 2007/0129208 A1* | 6/2007 | Willmot | ............... B60W 10/113 475/339 |

(Continued)

FOREIGN PATENT DOCUMENTS

| | | |
|---|---|---|
| DE | 102015222690 A1 | 5/2017 |
| DE | 102015222691 A1 | 5/2017 |

(Continued)

OTHER PUBLICATIONS

Translation of excerpts from "Twin Drive—Ein Schritt in Richtung Elektromobilitaet", VDI-FVT Yearbook, p. 68 annual book Volkswagen AG 2009.

*Primary Examiner* — David J Hlavka
(74) *Attorney, Agent, or Firm* — Slayden Grubert Beard PLLC

(57) ABSTRACT

A drive train for a hybrid motor vehicle having a gearbox input shaft operatively connected to a first electric machine and an internal combustion engine via a first partial drive train to transmit torque and which is operatively connected to a second electric machine via a second partial drive train to transmit torque. The second electric machine is permanently connected to the gearbox input shaft for torque transmission and the first electric machine and the internal combustion engine can be connected to the gearbox input shaft in a coupleable manner to transmit torque. The first electric machine and the second electric machine are arranged coaxially to one another, and driven shaft of the first electric machine is arranged radially inside a driven shaft of the second electric machine. The driven shaft of the (Continued)

first electric machine is mounted on the driven shaft of the second electric machine via a bearing.

9 Claims, 4 Drawing Sheets

(51) Int. Cl.
  *B60K 6/48* (2007.10)
  *B60W 10/08* (2006.01)

(52) U.S. Cl.
  CPC . *B60K 2006/4825* (2013.01); *B60L 2240/423* (2013.01); *B60W 2510/0208* (2013.01); *B60Y 2200/92* (2013.01)

(58) Field of Classification Search
  CPC .... B60K 2006/4825; B60K 2006/4833; B60K 6/40; B60K 6/387; B60L 6/423
  See application file for complete search history.

(56) References Cited

U.S. PATENT DOCUMENTS

| | | | | |
|---|---|---|---|---|
| 2011/0136609 A1* | 6/2011 | Knoblauch | ........... | B60W 20/30 475/150 |
| 2014/0296013 A1* | 10/2014 | Hata | ...................... | B60K 6/365 475/5 |
| 2015/0080162 A1* | 3/2015 | Motoyama | ............. | B60K 6/387 475/5 |
| 2015/0141198 A1* | 5/2015 | Tomo | ................... | B60W 10/02 477/5 |

FOREIGN PATENT DOCUMENTS

| | | |
|---|---|---|
| DE | 102015222692 A1 | 5/2017 |
| DE | 102015222694 A1 | 5/2017 |
| EP | 2578428 A2 | 4/2013 |
| WO | 2006034520 A1 | 4/2006 |
| WO | 2011054097 A1 | 5/2011 |
| WO | 2017084887 A1 | 5/2017 |
| WO | 2017084888 A1 | 5/2017 |
| WO | 2017084889 A1 | 5/2017 |

* cited by examiner

HYBRID POWERTRAIN WITH TWO ELECTRIC MACHINES AND AN INTERNAL COMBUSTION ENGINE

CROSS-REFERENCE TO RELATED APPLICATIONS

This application is a divisional application of U.S. application Ser. No. 16/765,698 filed May 20, 2020, which is the U.S. National Phase of PCT Appln. No. PCT/DE2018/100865 filed Oct. 23, 2018, which claims priority to DE 10 2017 127 695.5 filed Nov. 23, 2017, the entire disclosures of which are incorporated by reference herein.

TECHNICAL FIELD

The disclosure relates to a drive train for a hybrid motor vehicle, comprising a gearbox input shaft which is operably connected to a first electric machine and an internal combustion engine by means of a first partial drive train for torque transmission and is operably connected to a second electric machine by means of a second partial drive train for torque transmission.

BACKGROUND

Drive devices for hybrid vehicles are already known from the prior art. For example, DE 10 2015 222 691 A1 discloses a drive device and a method for controlling the drive device of a hybrid vehicle, which comprises an internal combustion engine, a first electric machine, a second electric machine and a rechargeable battery.

DE 10 2015 222 690 A1 also discloses a drive device and a method for controlling the drive device of a hybrid vehicle, which comprises an internal combustion engine, a first electric machine, a second electric machine and a rechargeable battery, wherein the drive device can be operated to drive the hybrid vehicle in the following three operating modes: a purely electric operation, in which a drive torque is produced by means of the second electric machine, while the internal combustion engine is switched off; a series hybrid operation, in which the drive torque is produced by means of the second electric machine, and the internal combustion engine drives the first electric machine to generate electrical energy; a parallel hybrid operation, in which a drive torque is produced by means of the internal combustion engine, wherein the method comprises: controlling the drive device in the series hybrid operation in such a way that the internal combustion engine is operated at an operating point based on a combined efficiency which is dependent on the efficiency of the internal combustion engine and on the efficiency of the first electric machine.

DE 10 2015 222 692 A1 also discloses, inter alia, a drive device and a method for operating the drive device of a hybrid vehicle to drive a drive wheel, wherein the drive device comprises an internal combustion engine, a first electric machine which is coupled to the internal combustion engine, a second electric machine, an electric battery and a main clutch between the internal combustion engine and the drive wheel, wherein the method comprises: Operating the drive device in a first operating mode of the following three operating modes: a purely electric operation, in which a drive torque acting on the drive wheel is produced by means of the second electric machine, while the internal combustion engine is switched off; a series hybrid operation, in which the internal combustion engine drives the first electric machine to generate electrical energy, which is used by the second electric machine to produce the drive torque; a parallel hybrid operation, in which the drive torque is produced by means of the internal combustion engine; and switching at least once from the first operating mode to a second operating mode of the three operating modes, wherein the drive torque provided during the switch from the first operating mode to the second operating mode corresponds to a suitably selectable progression between the drive torque provided before and after the switch.

DE 10 2015 222 694 A1 additionally discloses a drive device and a method for operating the drive device of a hybrid vehicle to drive a drive wheel, wherein the drive device comprises an internal combustion engine, a first electric machine which is coupled to the internal combustion engine, a second electric machine which can be coupled to the drive wheel, and an electric battery, and further comprises a main clutch and a gearbox, which are arranged between the internal combustion engine and the drive wheel, wherein the method comprises: while a first gear of the gearbox is selected, operating the internal combustion engine at a first speed for the first gear in a parallel hybrid operation, in which, when the main clutch is closed, a drive torque acting on the drive wheel is generated by means of the internal combustion engine; switching to a series hybrid operation, in which the internal combustion engine drives the first electric machine to generate electrical energy which is used by the second electric machine to produce the drive torque; opening the main clutch; setting a speed of the internal combustion engine, when the main clutch is open, to a second speed for a second gear of the gearbox in the parallel hybrid operation; selecting the second gear of the gearbox; closing the main clutch; and switching to the parallel hybrid operation while the second gear is selected.

However, the prior art still has the disadvantage that a drive train of a hybrid vehicle comprising two electric machines and an internal combustion engine requires a very large installation space, in particular with respect to the overall axial length, and is very expensive as a result of the large number of components required, such as gearwheels, gear pairs, bearings and shafts.

SUMMARY

The problem addressed by the disclosure is thus that of preventing or at least reducing the disadvantages from the prior art. In particular, a drive train for a hybrid vehicle comprising two electric machines and an internal combustion engine which can be implemented in a both compact and cost-effective manner is to be developed.

In the case of a device of the type in question, the problem addressed by the disclosure is solved according to the disclosure in that the second electric machine is permanently connected, that is to say in a permanent/fixed/non-couplable manner, to the gearbox input shaft for torque transmission, and the first electric machine and the internal combustion engine can be connected in a couplable manner, that is to say in a selectively switchable manner, to the gearbox input shaft for force transmission. In other words, the clutches K1 and K2 described in the prior art, which, in a couplable manner, connect the internal combustion engine to the first electric machine and connect the second electric machine to the gearbox input shaft respectively, are omitted. This has the advantage that, as a result, the number of components required can be considerably reduced, which has a positive effect on the total cost. In addition, the first electric machine and the second electric machine are arranged coaxially with one another and a driven shaft of the first electric machine is arranged radially inside a driven shaft of the second electric machine. According to the disclosure, the driven shaft of the first electric machine is mounted on the driven shaft of the second electric machine via a bearing.

Advantageous embodiments are claimed in the claims and will be described in greater detail below.

A rotor of the second electric machine is advantageously mounted in the gearbox housing via a first bearing and a second bearing.

Furthermore, it is advantageous if the first electric machine is connected to the internal combustion engine so as to transmit torque via a first transmission stage, and the first transmission stage is formed by a toothing on a drive flange of the internal combustion engine and a toothing on a driven shaft of the first electric machine, wherein the toothing of the drive flange is designed as an internally toothed ring gear.

Furthermore, it is advantageous for a switchable clutch to be arranged between the second partial drive train comprising the second electric machine and the first partial drive train comprising the first electric machine and the internal combustion engine. In other words, the separating clutch (K0) is thus arranged between the two electric machines, which advantageously allows a compact configuration of the drive train and thus a reduction in the overall axial length. In addition, the torque on the separating clutch which is to be transmitted is reduced as a result, which advantageously allows a more compact design of the separating clutch, which therefore requires less installation space.

Furthermore, it is advantageous for only one clutch to be arranged in the drive train. In other words, the clutches between the internal combustion engine and the first electric machine, and between the second electric machine and the gearbox input shaft are omitted without replacement. As a result, the number of components required is advantageously reduced.

In addition, it is advantageous for the first electric machine to be permanently connected to the internal combustion engine for torque transmission. The clutch between the internal combustion engine and the first electric machine can thus be omitted. This is preferable only when the hybrid vehicle is not driven solely by the first electric machine for electric driving in any operating state.

An advantageous exemplary embodiment is characterized in that only one (first) transmission stage is formed between the internal combustion engine and the first electric machine.

In particular, it is thus advantageous for the internal combustion engine to be arranged axially parallel to the first electric machine and/or the second electric machine. Thus, firstly only one common transmission stage is required, and secondly, a torque transmission from a drive flange of the internal combustion engine to the driven shaft of the first electric machine and/or of the second electric machine is possible.

In this case, it is particularly preferable for the transmission stage between the internal combustion engine and the first electric machine and/or the second electric machine, starting from the internal combustion engine as a driving element and the two electric machines as a driven element to be in the form of a speed-increasing ratio (i<1). A speed-reducing ratio is also possible in an alternative embodiment.

In addition, it is advantageous for an additional (second) transmission stage to be present between the driven shaft of the second electric machine and the gearbox input shaft or a countershaft. Thus, the torque of the first partial drive train and/or of the second partial drive train can be transmitted in a geared manner to a gearbox.

In particular, it is preferable for the second transmission stage, starting from the driven shaft of the second electric machine as a driving element and the countershaft as a driven element to be in the form of a speed-reducing ratio (i>1). A speed-increasing ratio is also possible in an alternative embodiment.

In addition, it is expedient for another (third) transmission stage to be present between the countershaft and a differential gear. Thus, the torque of the countershaft can be transmitted in a geared manner to the differential gear.

In particular, it is preferable for the third transmission stage, starting from the countershaft as a driving element and the differential gear as a driven element to be in the form of a speed-reducing ratio (i>1).

Furthermore, it is advantageous for the first electric machine and the second electric machine to be arranged in the axial direction on one side of the (first) transmission stage or the (second) transmission stage, and the internal combustion engine to be arranged in the axial direction on the other side of the (first) transmission stage or the (second) transmission stage.

It is also preferable for the first electric machine and/or the second electric machine to be cooled. It is particularly preferable for the cooling to take place by means of water cooling from a vehicle cooling circuit or by means of oil cooling using transmission oil from the gearbox.

Furthermore, it is expedient for the first electric machine and/or the second electric machine to be able to be used both as a traction motor in motor mode and as a generator in generator mode. As a result, it is possible to use the drive train in various operating modes.

It is also expedient for a vibration damper to be arranged between the internal combustion engine and the first and/or the second electric machine. Advantageously, it is thus possible to compensate for vibrations and to control resonance.

In addition, it is advantageous for a slip clutch to be arranged between the internal combustion engine and the first and/or the second electric machine. The drive train can thus be protected against overloading.

In addition, it is advantageous for there to be a parking lock for locking the gearbox input shaft when the motor vehicle is parked, preferably by means of an interlocking connection to the countershaft. It is also preferable for the parking lock to be actuated electromechanically or mechanically.

Furthermore, an advantageous exemplary embodiment is characterized in that the separating clutch is in the form of a preferably oil-cooled multi-plate clutch. It is also advantageous for the separating clutch to be in the form of a dog clutch. It is also possible for the separating clutch to be in the form of an electromagnetic clutch.

Furthermore, it is advantageous for the separating clutch to be operable by means of a central clutch release system. In this case, the central clutch release system can be actuated hydraulically, mechanically or electromechanically. In addition, it is expedient for the separating clutch to be operable by means of a hydraulic rotary transmission leadthrough.

Moreover, it is advantageous for the separating clutch to be in the form of a normally closed, normally open or normally stay clutch.

It is also advantageous for the drive train to allow operation in a first operating mode in which the gearbox input shaft is driven purely electrically, and regenerative braking is made possible. In the first operating mode, the separating clutch is open, and the first electric machine and the internal combustion engine, that is to say the first partial drive train, are uncoupled from the gearbox input shaft. Thus only the second electric machine is used as a prime mover. The second electric machine is thus used as a traction motor (during electric driving/when providing electric power) and as a generator (during regenerative braking).

It is also advantageous for the drive train to allow operation in a second operating mode in which a series hybrid operation is carried out. This means that the second electric machine acts as a traction motor for the gearbox input shaft, and the internal combustion engine drives the first electric machine to generate electrical energy. In the second operating mode, the separating clutch is open.

Furthermore, it is expedient for the drive train to allow operation in a third operating mode in which a parallel hybrid operation is carried out. This means that the internal combustion engine and additionally the first and/or the second electric machine applies a torque to the gearbox input shaft. The separating clutch is thus closed.

It is thus advantageous for the drive train to be configured in such a way that it allows operation in a first operating mode for purely electric power, in which the clutch is open, and only the second electric machine acts as a prime mover for the gearbox input shaft, and/or in a second operating mode for the series hybrid drive system, in which the clutch is open, the second electric machine acts as a prime mover for the gearbox input shaft, and the internal combustion engine acts as a prime mover for the first electric machine to generate electrical energy, and/or in a third operating mode for the parallel hybrid drive system, in which the internal combustion engine and additionally the first electric machine and/or the second electric machine acts as a prime mover for the gearbox input shaft.

BRIEF DESCRIPTION OF THE DRAWINGS

The disclosure will be explained further in the following by the drawings, in which.

The drawings are of a purely schematic nature and are used solely to provide understanding of the disclosure. Like elements are denoted by the same reference signs.

DETAILED DESCRIPTION

Figure 1:
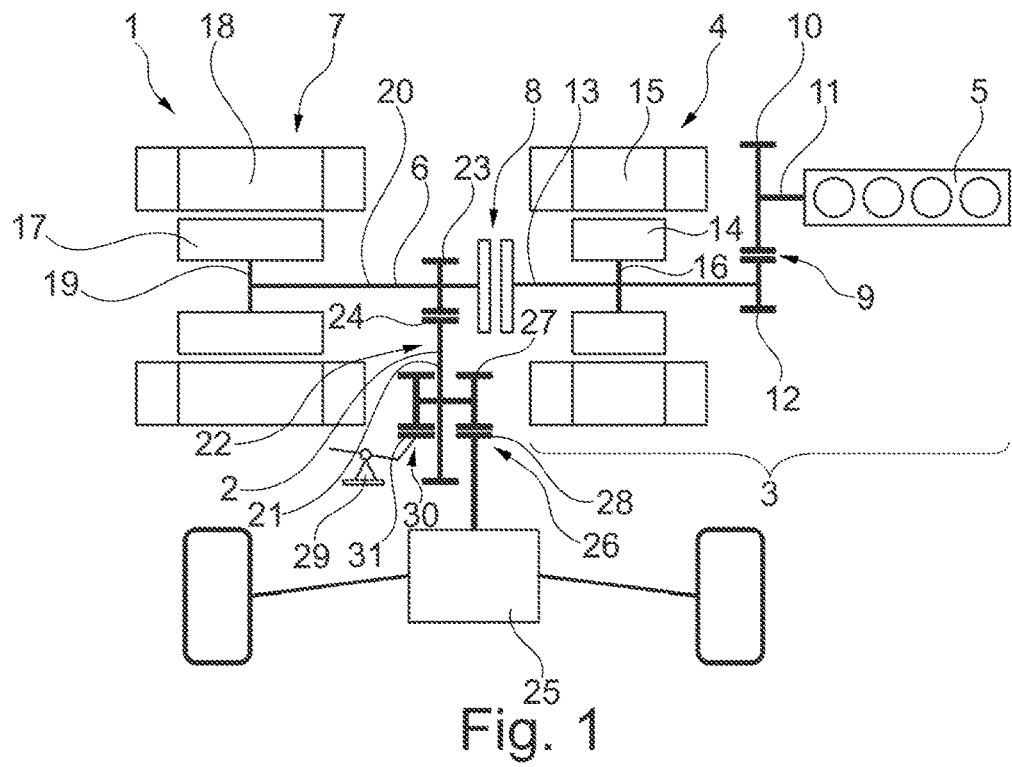
FIG. 1 is a schematic diagram of a drive train according to the disclosure for a hybrid motor vehicle.

FIG. 1 is a schematic diagram of a drive train 1 according to the disclosure for a hybrid motor vehicle. In the drive train 1, a gearbox input shaft 2 is operably connected in a couplable manner by means of a first partial drive train 3 to a first electric machine (e-machine) 4 and an internal combustion engine (ICE) 5 for torque transmission. The gearbox input shaft 2 is permanently operably connected by means of a second partial drive train 6 to a second electric machine (e-machine) 7. The second electric machine 7 is connected to the gearbox input shaft 2 in each operating state, whereas the first electric machine 4 and the internal combustion engine 5 can be decoupled from the gearbox input shaft 2 by means of a clutch/separating clutch 8.

The first partial drive train 3 can thus be connected by means of the separating clutch 8 to the second partial drive train 6 and thus to the gearbox input shaft 2 for torque transmission. The first electric machine 4 is arranged coaxially with the second electric machine 7. The internal combustion engine 5 is arranged axially parallel to the first electric machine 4 and the second electric machine 7. The internal combustion engine 5 is permanently connected to, that is to say cannot be decoupled from, the first electric machine 4 by means of a first transmission stage ($i_1$) 9 for torque transmission. The first transmission stage 9 is formed by a toothing 10 on a drive flange 11 of the internal combustion engine 5 and a toothing 12 on a driven shaft 13 of the first electric machine 4. The first transmission stage 9, starting from the internal combustion engine 5, is a speed-increasing ratio, that is to say $i_1<1$. The driven shaft 13 can also function as a drive shaft when the first electric machine 4 is used in a generator mode. However, for the sake of simplicity, the driven/drive shaft 13 of the first electric machine 4 will be referred to in the following as driven shaft 13.

The first electric machine 4 comprises a rotor 14 and a stator 15 which is arranged concentrically with and radially outside said rotor. The rotor 14 is rigidly connected by means of a rotor support 16 to the driven shaft 13 of the first electric machine 4. The driven shaft 13 is connected in a rotationally fixed manner to part of the separating clutch 8.

The second electric machine 7 comprises a rotor 17 and a stator 18 which is arranged concentrically with and radially outside said rotor. The rotor 17 is rigidly connected by means of a rotor support 19 to a driven shaft 20 of the second electric machine 7. The driven shaft 20 can also function as a drive shaft when the second electric machine 7 is used in a generator mode. However, for the sake of simplicity, the driven/drive shaft 20 of the second electric machine 7 will be referred to in the following as driven shaft 20. The driven shaft 20 of the second electric machine 7 is connected in a rotationally fixed manner to another part of the separating clutch 8 so that the driven shaft 20 of the second electric machine 7 is coupled in a rotationally fixed manner to the driven shaft 13 of the first electric machine 4 when the separating clutch 8 is closed.

The driven shaft 20 of the second electric machine 7 is permanently connected to, that is to say cannot be decoupled from, the gearbox input shaft 2 or a countershaft 21 for torque transmission, by means of a second transmission stage ($i_2$) 22. The second transmission stage 22 is formed by a toothing 23 on the driven shaft 20 of the second electric machine 7 and a toothing 24 on the countershaft 21. Starting from the driven shaft 20 of the second electric machine 7, the second transmission stage 22 is a speed-decreasing ratio, i.e. $i_2>1$.

The countershaft 21 is connected by means of a third transmission stage ($i_3$) 26 to a differential gear 25 for torque transmission. The third transmission stage 26 is formed by a toothing 27 on the countershaft 21 and a toothing 28 on the differential gear 25. The third transmission stage 26, starting from the countershaft 21, is a speed-decreasing ratio, i.e. $i_3>1$. A parking lock 29 is formed by means of an interlocking connection 30 to the countershaft 21 or to an integrated toothing 31 on the countershaft 21.

Figure 2:
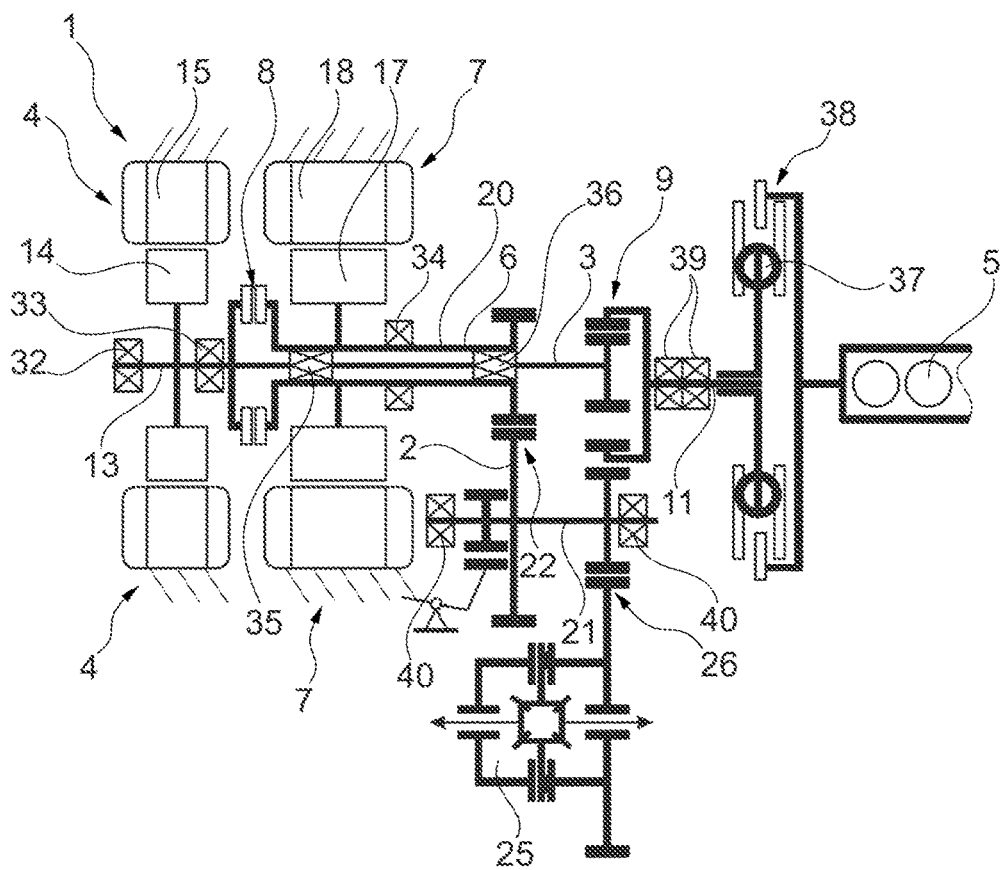
FIG. 2 is a schematic view of the drive train according to the disclosure, having a first bearing design.

FIG. 2 is a schematic view of the drive train 1 according to the disclosure. The rotor 14 of the first electric machine 4 is mounted in a gearbox housing (not shown) by means of a first bearing 32 and a second bearing 33. The rotor 17 of the second electric machine 4 is mounted in the gearbox housing by means of a first bearing 34 and on the driven shaft 13 of the first electric machine 4 by means of a second bearing 35. The driven shaft 20 is mounted on the driven shaft 13 by means of an additional bearing 36. The driven shaft 20 of the second electric machine 7 is in the form of a hollow shaft which the driven shaft 13 of the first electric machine 4 is arranged radially inside. The first electric machine 4 is arranged in the axial direction on a side of the second electric machine 7 facing away from the internal combustion engine. The separating clutch 8 is arranged in the axial direction between the first electric machine 4 and the second electric machine 7. The separating clutch 8 is arranged in the axial direction on the side of the second electric machine 7 facing away from the internal combustion engine.

The first transmission stage 9 is arranged in the axial direction between the internal combustion engine 5 and the second electric machine 7 and thus also between the internal combustion engine 5 and the first electric machine 4. The second transmission stage 22 is arranged in the axial direction between the first transmission stage 9 and the second electric machine 7. The bearing 36 is arranged in the axial direction at the level of the second transmission stage 22

The internal combustion engine 5 is connected to the driven shaft 13 of the first electric machine 4 by means of a vibration damper 37 and a slip clutch 38. The drive flange 11 of the internal combustion engine 5 is mounted in the gearbox housing by means of two bearings 39. The toothing 10 of the drive flange 11 is in the form of an internally toothed ring gear. The toothing 12 of the driven shaft 13 and the toothing 23 of the driven shaft 20 are each in the form of an externally toothed spur gear. The countershaft 21 is mounted in the gearbox housing by means of two bearings 40. The toothings 24, 27 of the countershaft 21 are each in the form of an externally toothed spur gear. The toothing 28 of the differential gear 25 is in the form of an externally toothed spur gear.

Figure 3:
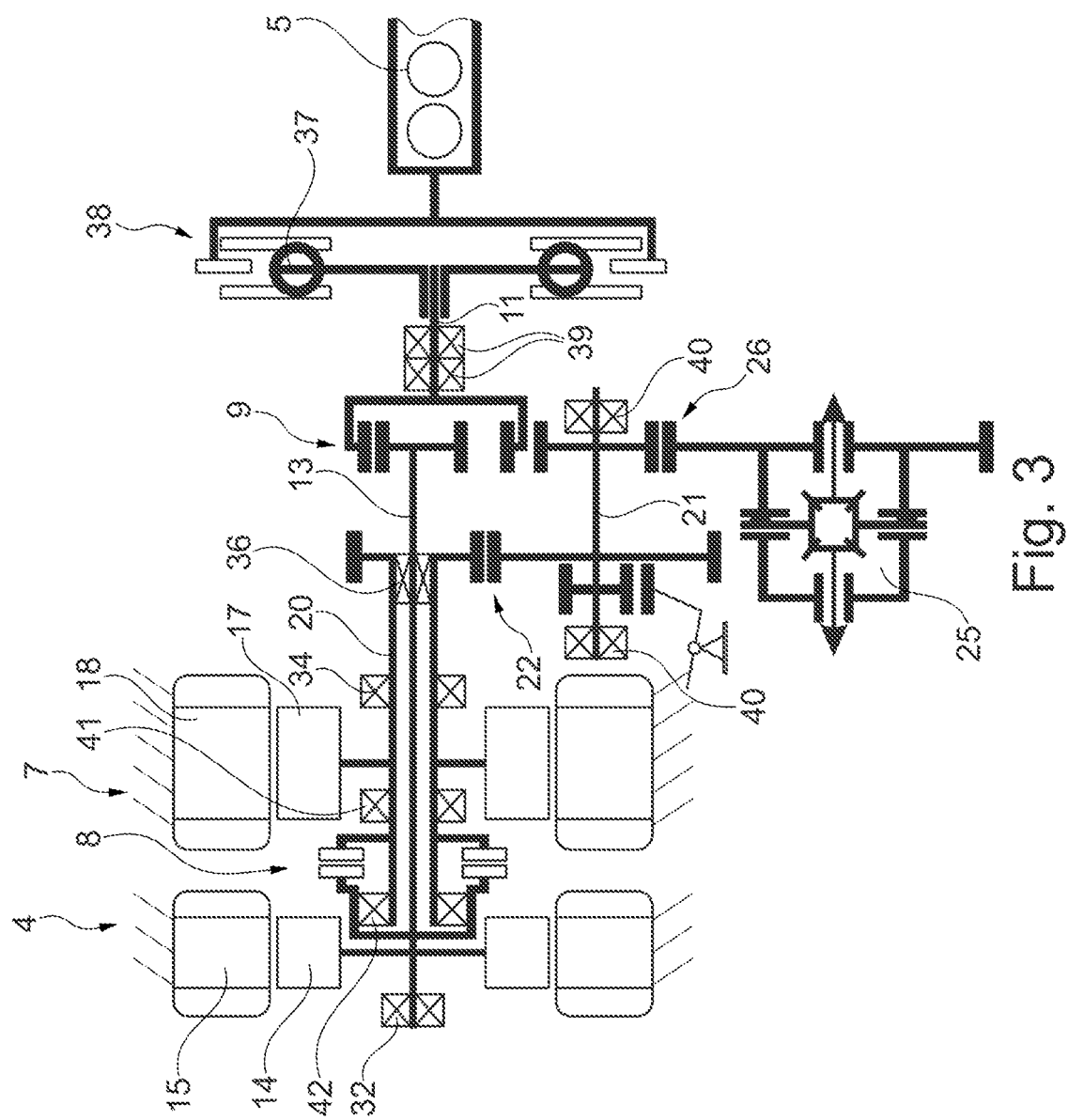
FIG. 3 is a schematic view of the drive train having a second bearing design.

FIG. 3 shows an alternative system for mounting the driven shaft 13 and the driven shaft 20. The rest of the features correspond to those from FIG. 2 and, for the sake of simplicity, are not described again. The rotor 17 of the second electric machine 7 is mounted in the gearbox housing by means of the first bearing 34 and a second bearing 41. The rotor 14 of the first electric machine 4 is mounted in the gearbox housing by means of the first bearing 32 and on the driven shaft 20 of the second electric machine 7 by means of a second bearing 42. The driven shaft 13 is mounted on the driven shaft 20 by means of the additional bearing 36.

Figure 4:
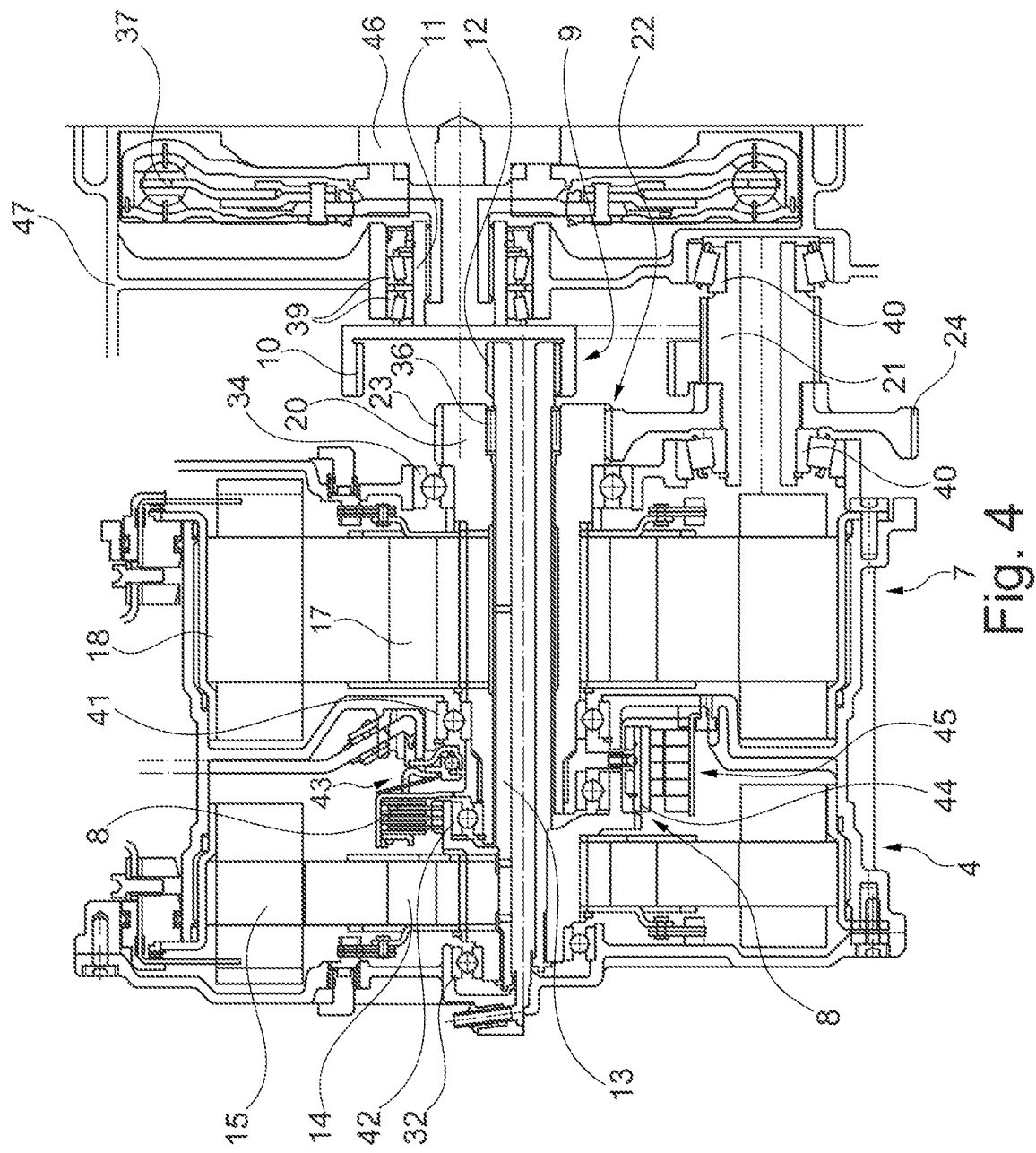
FIG. 4 is a longitudinal sectional view of the drive train from FIG. 3.
Figure 5:
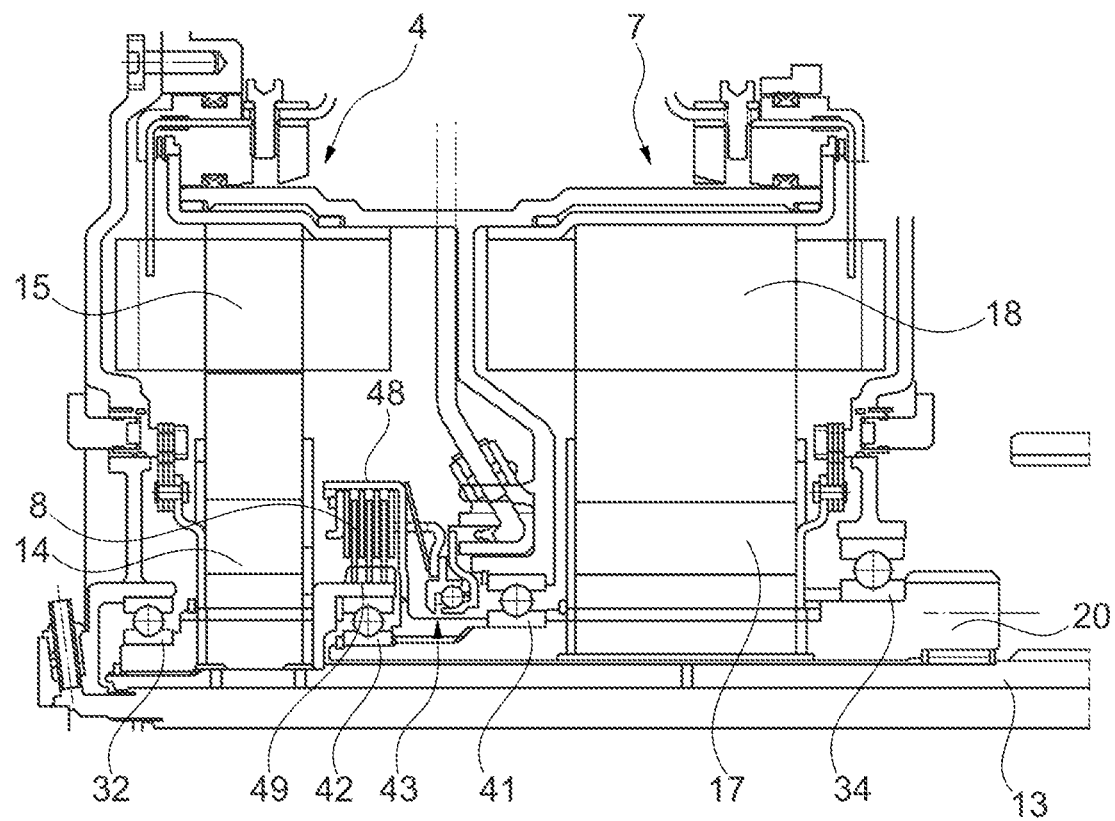
FIG. 5 is an enlarged view of part of the drive train shown in the longitudinal sectional view in FIG. 4.

FIGS. 4 and 5 show a longitudinal sectional view of the drive train 1. In this case, in one embodiment, the separating clutch 8 is in the form of a multi-plate clutch which is operated by means of a hydraulic central clutch release mechanism 43. In another embodiment, the separating clutch 8 is in the form of a dog clutch in which a sliding sleeve 44 can be moved in an electrically driven manner by an electric motor 45 to open or close the separating clutch 8.

The internal combustion engine 5 is connected to the drive flange 11 by means of a crankshaft flange 46 and by means of the vibration damper 37, which is in the form of a torsional vibration damper. In FIGS. 4 and 5, a gearbox housing 47 is also shown in which the driven shaft 13 is mounted by means of the bearings 32, 42, the driven shaft 20 is mounted by means of the bearings 34, 41, the drive flange 11 is mounted by means of the bearings 39, and the countershaft 21 is mounted by means of the bearings 40. The bearings 32, 34, 41, 42 are in the form of ball roller bearings, whereas the bearings 39 are in the form of tapered roller bearings in an O arrangement, and the bearings 40 are in the form of tapered roller bearings in an X arrangement.

The separating clutch 8 in the form of a multi-plate clutch in FIG. 5 comprises an outer plate carrier 48 which is connected in a rotationally fixed manner by means of a shaft-hub connection to the driven shaft 20, and an inner plate carrier 49, which is formed integrally with the rotor support 16 of the first electric machine 4.

LIST OF REFERENCE NUMBERS 1 drive train
2 gearbox input shaft
3 first partial drive train
4 first electric machine
5 internal combustion engine
6 second partial drive train
7 second electric machine
8 separating clutch
9 first transmission stage
10 toothing
11 drive flange
12 toothing
13 drive/driven shaft
14 rotor
15 stator
16 rotor support
17 rotor
18 stator
19 rotor support
20 drive/driven shaft
21 countershaft
22 second transmission stage
23 toothing
24 toothing
25 differential gear
26 third transmission stage
27 toothing
28 toothing
29 parking lock
30 interlocking connection
31 integrated toothing
32 first bearing
33 second bearing
34 first bearing
35 second bearing
36 bearing
37 vibration damper
38 slip clutch
39 bearings
40 bearings
41 second bearing
42 second bearing
43 central clutch release mechanism
44 sliding sleeve
45 electric motor
46 crankshaft flange
47 gearbox housing
48 outer plate carrier
49 inner plate carrier

What is claimed is:
1. A drive train for a hybrid motor vehicle, comprising:
a gearbox input shaft operatively connected to a first electric machine and an internal combustion engine via a first partial drive train to transmit torque and which is operatively connected to a second electric machine to transmit torque via a second partial drive train, the second electric machine being permanently connected to the gearbox input shaft to transmit torque and the first electric machine and the internal combustion engine being connectable with the gearbox input shaft in a coupleable manner to transmit torque, wherein the first electric machine and the second electric machine are arranged coaxially to each other, wherein a driven shaft of the first electric machine is arranged radially inside a driven shaft of the second electric machine, wherein the driven shaft of the first electric machine is supported by the driven shaft of the second electric machine via a bearing, and wherein a separating clutch is arranged between the second partial drive train with the second electric machine and the first partial drive train with the first electric machine and the internal combustion engine.

2. The drive train according to claim 1, wherein a rotor of the second electric machine is mounted in a gearbox housing via a first bearing and a second bearing.

3. The drive train according to claim 1, wherein the first electric machine is connected to the internal combustion engine to transmit torque via a first transmission stage, wherein the first transmission stage is provided by a toothing formed on a drive flange of the internal combustion engine and a toothing formed on the driven shaft of the first electric machine, and wherein the toothing of the drive flange is formed as an internally toothed ring gear.

4. The drive train according to claim 1, wherein only one clutch is arranged in the drive train.

5. The drive train according to claim 1, wherein the first electric machine is permanently connected to the internal combustion engine to transmit torque.

6. The drive train according to claim 1, wherein only one transmission stage is formed between the internal combustion engine and the first electric machine.

7. The drive train according to claim 6, wherein the first electric machine and the second electric machine are arranged in an axial direction on one side of the transmission stage and the internal combustion engine is arranged in the axial direction on the other side of the transmission stage.

8. The drive train according to claim 1, wherein the drive train is configured to operate in:

a first operating mode for purely electrical driving, in which the clutch is open and only the second electric machine acts as a drive machine for the gearbox input shaft, a second operating mode for a serial hybrid drive, in which the clutch is open, the second electric machine acts as the drive machine for the gearbox input shaft and the internal combustion engine acts as a drive machine for the first electric machine to generate electrical energy, or a third operating mode for a parallel hybrid drive, in which the internal combustion engine and additionally the first electric machine or the second electric machine acts as the drive machine for the gearbox input shaft.

9. A drive train for a hybrid motor vehicle, comprising:

a gearbox input shaft operatively connected to a first electric machine and an internal combustion engine via a first partial drive train to transmit torque and which is operatively connected to a second electric machine to transmit torque via a second partial drive train, the second electric machine being permanently connected to the gearbox input shaft to transmit torque and the first electric machine and the internal combustion engine being connectable with the gearbox input shaft in a coupleable manner to transmit torque, wherein the first electric machine and the second electric machine are arranged coaxially to each other, wherein a driven shaft of the first electric machine is arranged radially inside a driven shaft of the second electric machine, wherein the driven shaft of the first electric machine is supported by the driven shaft of the second electric machine via a bearing, wherein the first electric machine is connected to the internal combustion engine to transmit torque via a first transmission stage, wherein the first transmission stage is provided by a toothing formed on a drive flange of the internal combustion engine and a toothing formed on the driven shaft of the first electric machine, and wherein the toothing of the drive flange is formed as an internally toothed ring gear.

* * * * *